United States Patent [19]
Newlin

[11] Patent Number: 5,774,857
[45] Date of Patent: Jun. 30, 1998

[54] CONVERSION OF COMMUNICATED SPEECH TO TEXT FOR TRANMISSION AS RF MODULATED BASE BAND VIDEO

[75] Inventor: Douglas J. Newlin, Geneva, Ill.

[73] Assignee: Motorola, Inc., Schaumburg, Ill.

[21] Appl. No.: 751,048

[22] Filed: Nov. 15, 1996

[51] Int. Cl.$^6$ ............................................. G10L 3/00
[52] U.S. Cl. ..................... 704/271; 704/276; 704/235; 704/200
[58] Field of Search .................. 704/235, 3, 270, 704/200, 201, 231, 271, 276, 251, 255, 257; 348/468

[56] References Cited

U.S. PATENT DOCUMENTS

| | | | |
|---|---|---|---|
| 4,707,858 | 11/1987 | Fette | 704/251 |
| 4,975,957 | 12/1990 | Ichikawa et al. | 704/220 |
| 5,031,113 | 7/1991 | Höllerbauer | 704/235 |
| 5,212,551 | 5/1993 | Conanan | 348/484 |
| 5,543,851 | 8/1996 | Chang | 348/468 |
| 5,659,793 | 8/1997 | Escobar et al. | 345/302 |
| 5,677,739 | 10/1997 | Kirkland | 348/468 |

*Primary Examiner*—David R. Hudspeth
*Assistant Examiner*—Donald L. Storm
*Attorney, Agent, or Firm*—J. Ray Wood

[57] ABSTRACT

Apparatuses, systems, and a method provide for a visual display of speech, such as the visual display of a received audio signal in telecommunications, especially useful for the hearing impaired. The preferred apparatus includes a network interface that is coupleable to a first communication channel to receive an audio signal; a radio frequency (RF) modulator to convert a baseband output video signal to a RF output video signal and to transmit the RF output video signal on a second communication channel for video display; and a processor coupled to the network interface and to the RF modulator for running a set of program instructions to convert the received audio signal to a text representation of speech, and to further convert the text to the baseband output video signal. The RF output video signal, when displayed on a video display, provides the visual display of speech. The preferred apparatus may also include a speech generation subsystem.

26 Claims, 4 Drawing Sheets

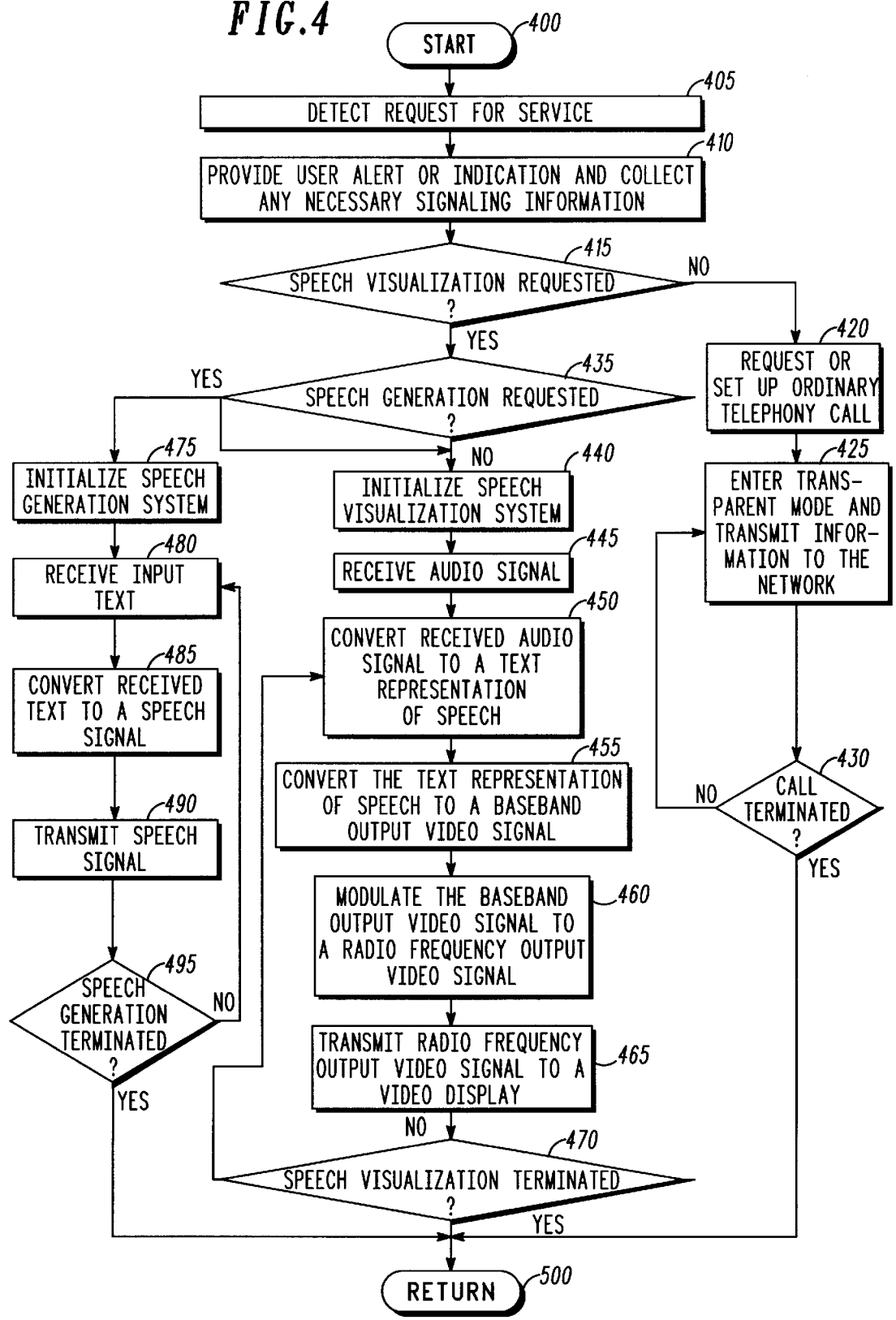

5,774,857

CONVERSION OF COMMUNICATED SPEECH TO TEXT FOR TRANMISSION AS RF MODULATED BASE BAND VIDEO

CROSS-REFERENCE TO RELATED APPLICATIONS

This application is related to the following United States Patent Applications (collectively referred to as the "related applications"), each incorporated by reference herein, with priority claimed for all commonly disclosed subject matter:

Newlin et al., U.S. patent application Ser. No. 08/658,792, filed Jun. 5, 1996, entitled "Audio/Visual Communication System and Method Thereof", Motorola Docket No. PD05634AM (the "first related application");

Burke et al., U.S. patent application Ser. No. 08/706,100, filed Aug. 30, 1996, entitled "Apparatus, Method And System For Audio And Video Conferencing And Telephony", Motorola Docket No. PD05686AM (the "second related application");

Burke et al., U.S. patent application Ser. No. 08/715887, filed Sep. 18, 1996, entitled "Videophone Apparatus, Method And System For Audio And Video Conferencing And Telephony", Motorola Docket No. PD05689AM (the "third related application");

Burke et al., U.S. patent application Ser. No. 08/725602, filed Oct. 3, 1996, entitled "Apparatus, Method And System For Wireline Audio And Video Conferencing And Telephony", Motorola Docket No. PD05703AM (the "fourth related application"); and Burke et al., U.S. patent application Ser. No. 08/726329, filed Oct. 3, 1996, entitled "Videophone Apparatus, Method And System For Wireline Audio And Video Conferencing And Telephony", Motorola Docket No. PD05725AM (the "fifth related application"); and Newlin et al., U.S. patent application Ser. No. 08/735295, filed Oct. 22, 1996, entitled "Apparatus, Method And System For Multimedia Control And Communication", Motorola Docket No. PD05688AM (the "sixth related application").

FIELD OF THE INVENTION

This invention relates in general to audio and video communications and, more specifically, to an apparatus, method and system for the visual display of speech communication.

BACKGROUND OF THE INVENTION

Conventional apparatuses and methods for the visual display of speech, such as the TDD systems for the hearing impaired, typically require both dedicated systems and user entry of the visual material to be displayed. For example, for telephone calls or sessions for the hearing impaired, a dedicated TDD system is employed for visual display of letters, words, and sentences, and all parties to the communication must employ such a dedicated system. In addition, utilizing a TDD system, each party to the telephone call must physically type each letter, word and sentence on a keyboard, which will be transmitted for display on a TDD system at the remote end.

Other conventional systems also specifically require manual intervention, with separate, physical entry of the visual material to be displayed. For example, the closed captioning services available over many television channels require that the audible, spoken words are translated and typed, by a service provider, into the closed captioning system for transmission as part of the audio/video or other television broadcast.

These conventional systems for the visual display of speech generally require dedicated systems at both the local and remote sites of the communication, and also require significant manual intervention for operation. As a consequence, such systems are comparatively expensive and difficult to use. Such systems are also subject to availability and location limitations; for example, such TDD systems may be difficult to locate while traveling, preventing telephony communication with a hearing impaired individual. In addition, the user requiring such a system cannot communicate with another site which does not have such a dedicated system available for use.

Accordingly, a need has remained for an apparatus, method and system for the visual display of speech which do not require dedicated apparatuses and systems at both the local and remote sites of the communication. In addition, such an apparatus and system also should not require significant manual intervention for operation, should be comparatively less expensive, and should be user friendly.

BRIEF DESCRIPTION OF THE DRAWINGS

FIG. 4 is a flow diagram illustrating a speech visualization and generation method in accordance with the present invention.

DETAILED DESCRIPTION OF THE INVENTION

Figure 1:
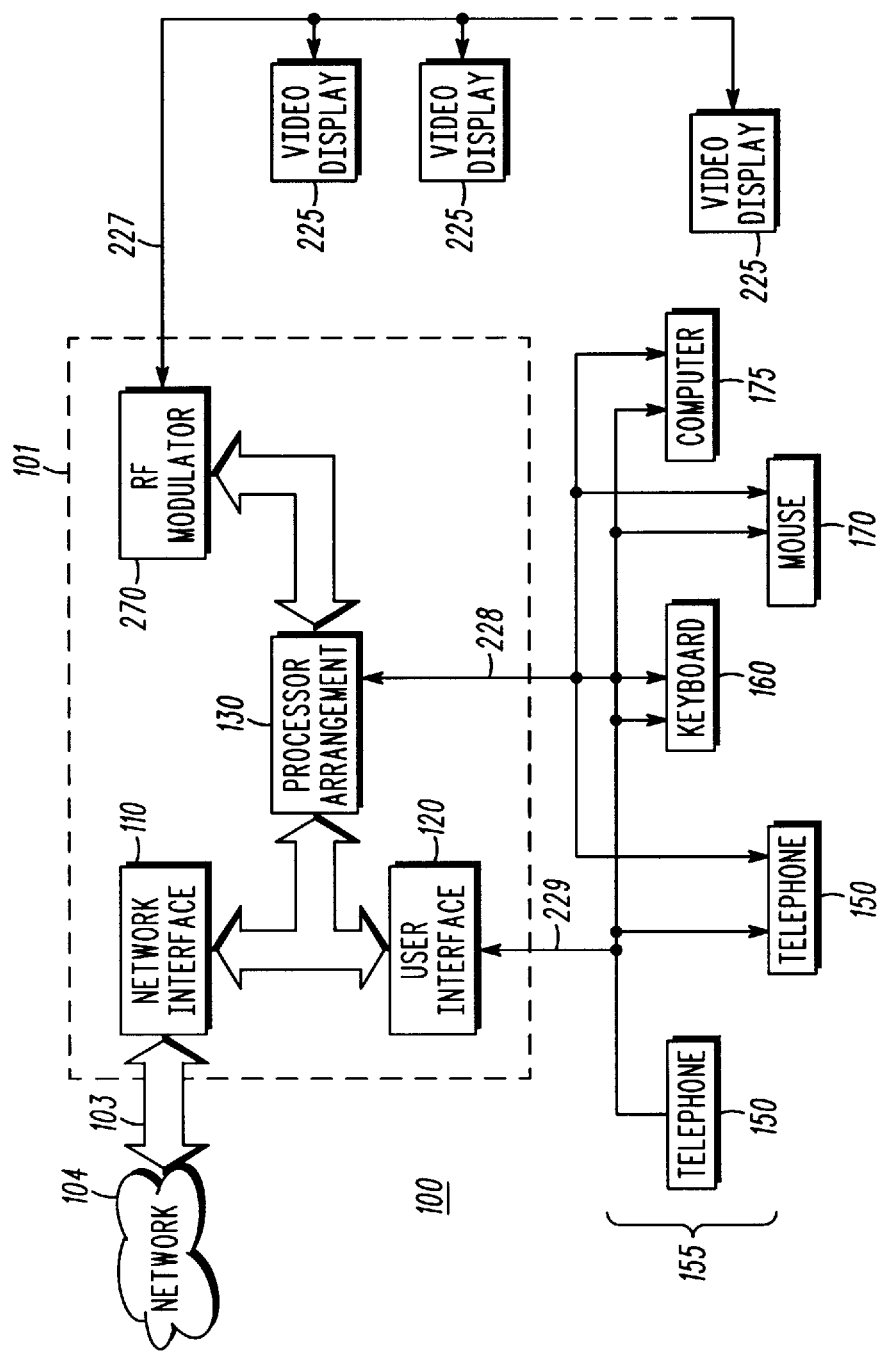
FIG. 1 is a block diagram illustrating a speech visualization apparatus and system in accordance with the present invention.

As discussed above, various needs have remained to provide for the visual display of speech, such as in a text or closed caption format, among other things, as an aid to the hearing impaired. Building upon the platform of the related applications, the apparatus, method and system of the present invention provide for the visual display of speech, without requiring dedicated apparatuses and systems at both the local and remote sites of the communication. In addition, the various embodiments of the present invention also do not require significant manual intervention for operation, are comparatively less expensive, and are user friendly.

The inventions disclosed in the various related applications provide for both telephony and for audio/video conferencing, utilizing a video access apparatus coupleable via a communications channel to a telecommunications network. In the second and third related applications, the preferred embodiment of the video access apparatus provides for both telephony and for audio/video conferencing utilizing a CACS (Cable ACcess System) protocol for communication with a primary station via hybrid fiber coaxial cable, with the primary station, in turn, providing connectivity to a telecommunications network and a cable television services infrastructure. In the fourth and fifth related applications, the video access apparatus provides for both telephony and for audio/video conferencing with direct wireline connectivity to a telecommunications network, utilizing a wireline network interface suitable, for example, for connection to an Integrated Services Digital Network ("ISDN") and/or to a Public Switched Telephone Network ("PSTN").

In the preferred embodiments of the second and fourth related applications, video conferencing capability is provided utilizing ordinary or common equipment and devices typically found in consumer or subscriber premises, such as telephones, televisions, and video cameras (video camcorders). In the third and fifth related applications, such video conferencing capability is provided utilizing one or more videophone apparatuses. Common to the inventions of each of the related applications, however, is the use of a physical interface (such as a telephone or keyboard) for the selection and control of the various media applications, such as to select an ordinary telephony mode or to select a video conferencing mode. In the preferred embodiments, one or more telephones may be used to provide for entry of various control signals, into an audio user interface of the video access apparatus, to select the operating mode of the video access apparatus. For example, in the preferred embodiment, entry of a predetermined sequence (such as "**" of the DTMF tones of a telephone) is utilized to select a video conferencing mode, with a telephony mode automatically and transparently selected in the absence of the predetermined sequence.

In the sixth related application, an apparatus and method provided for control over various and diverse multimedia applications, in addition to video conferencing and telephony. In the preferred embodiment of the invention of the sixth related application, the multimedia control apparatus provided for control over a plurality of media applications including telephony, video conferencing, analog video, digital video, and alternating current (AC) power line signaling (for control over premise or subscriber equipment such as heating, ventilation, air conditioning, lighting, security, and entertainment). Also in the preferred embodiment of the multimedia control apparatus, any connected telephone may become a multimode telephone, providing the physical interface for telephony functions and for multimedia control functions.

The apparatus, method and system of the present invention build upon these related applications, to provide for speech visualization of, for example, an audio telephone conversation or the audio portion of an audio/video conference. The communication may occur via any telecommunication network or other network, and no special or dedicated equipment is required at the remote site. As discussed in greater detail below, an incoming audio signal from a network is received and converted to a text representation, which is then transformed into a video signal transmitted to any connected television or other video display for viewing by the user, preferably in closed caption or in on screen display formats. The speech visualization apparatus may also include a speech generation subsystem, for those users who may also have speech impairments. The speech visualization apparatus of the present invention may be viewed as a variation of the various video access apparatuses, or may be viewed as a special case or specific media application of the multimedia control apparatus of the related applications. As discussed in greater detail below, the speech visualization apparatus contains many of the same components and subsystems of the video access apparatuses and multimedia control apparatus, and the related applications may be referred to for corresponding detailed descriptions and preferred component specifications.

FIG. 1 is a block diagram illustrating a speech visualization apparatus 101 and a speech visualization system 100 in accordance with the present invention. As illustrated in FIG. 1, the speech visualization system 100 includes the speech visualization apparatus 101, one or more video displays 225, and one or more physical interfaces 155, such as a telephone 150, a keyboard 160, a mouse 170, or a computer 175. The speech visualization apparatus 101 is coupleable, via a network interface 110, to a first (or network) communication channel 103 for communication with a network 104. The first or network communication channel 103 is also referred to as a network communication channel 03 to distinguish it from other communication channels of the speech visualization system 100, such as the second communication channel 227 utilized to communicate with the various video displays 225, or the third communication channel 228 utilized to communicate with the keyboard 160 or the other physical interfaces 155). The first communication channel 103 may be wireline, such as one or more twisted pair wires, may be cable, such as hybrid fiber coaxial cable, may be wireless, such as for cellular or other radio frequency transmissions, or may be of any other appropriate communications medium. The network 104, as disclosed in the fourth and fifth related applications, for example, may be a public switched telephone network ("PSTN") for ordinary telephony and analog data communications (also referred to as POTS, for plain old telephone service), or may be an Integrated Services Digital Network ("ISDN") for digital voice and data communications, or any combination of such existing or future telecommunications networks. For such wireline networks, the network communication channel 103 will usually be coupled to the network 104 through a local digital or analog switch (not illustrated). In addition, as disclosed in the second and third related applications, when a CACS communication protocol is implemented, the network communication channel 103 may be coupled to the network 104 via a primary station which, among other things, provides one or more network interfaces utilizing other or additional protocols, such as various ISDN protocols, and also provides for connection to a cable television ("CATV") services infrastructure.

The speech visualization apparatus 101 illustrated in FIG. 1 includes various features or components disclosed and discussed in detail in the related applications, including the network interface 110, the processor arrangement 130, and the user interface 120. Detailed block diagrams and preferred component specifications are also provided in the related applications. Depending upon the implementation of the speech visualization system 100, such as wireline, cable or wireless, the network interface 110 of the speech visualization apparatus 101 will vary accordingly. For example, for cable applications, as disclosed in the second and third related applications, the network interface 110 will be a cable network interface and will include a CATV transceiver and a communications ASIC (application specific integrated circuit), which perform various functions such as, respectively, radio frequency (RF) modulation and demodulation and CACS protocol encoding and decoding. For wireline applications, as disclosed in the fourth and fifth related applications, the network interface 110 will include a telephony (POTS) interface and/or an ISDN interface, which perform various functions such as, respectively, analog telephony (and also analog modem functions, e.g., International Telecommunications Union (ITU) V.34 and V.34bis protocols), and implementation of various digital (ISDN) protocols for voice and data transmission (e.g., ITU Q.921 LAPD data link and Q.910 physical layer (interface) digital protocols). As discussed in the related applications, the network interface 110 is utilized to transmit and receive analog or digital video, audio, and other information and data (generally referred to as data), in any given format, protocol, or modulation scheme compatible with the network 104 and with any particular network connections or switches. For example, when coupled to a digital network (such as ISDN) via the first communication channel 103, the network interface 110 will transmit and receive data, such as an audio signal for telephony, as digital information encoded and formatted in accordance with the ISDN series of protocols (such as the Q.x series). Also for example, when coupled to a PSTN via the first, network communication channel 103, the network interface 110 will transmit and receive data, such as an audio signal, as an ordinary, analog POTS audio signal.

Continuing to refer to FIG. 1, a processor arrangement 130 is connected or coupled to the network interface 110, to a user interface 120, and to a radio frequency (RF) modulator 270. The network interface 110, the user interface 120, and the RF modulator 270 are configured substantially and identically as disclosed and discussed in detail in the related applications. Various functions of each of these components are also discussed in greater detail below. For example, in the embodiment illustrated in FIG. 1, the speech visualization apparatus 101 includes, first, a network interface 110 which is coupleable to a first communication channel 103 for reception 10 of a first audio signal from a network 104 to form a received audio signal; second, a radio frequency modulator 270 to convert a baseband output video signal (from the processor arrangement 130) to a radio frequency output video signal, and to transmit the radio frequency output video signal on a second communication channel 227 for video display, such as via one of the video displays 225; and third, a processor arrangement 130, the processor arrangement coupled to the network interface 110 and to the radio frequency modulator 270, with the processor arrangement responsive, through a set of program instructions, as discussed below, to convert the received audio signal to a text representation of speech, and to further convert the text representation of speech to the baseband output video signal (to be modulated and transmitted by the RF modulator 270). Also as discussed below, the speech visualization apparatus preferably includes the user interface 120, for entry of control signals utilized to select various operating modes, such as ordinary telephony or speech visualization modes.

The user interface 120 is utilized for reception of a control signal of a plurality of control signals, such as a request to place a telephony call, a request for the visual display of speech during a telephone call or an audio/video conference call, a request for speech generation from input text, and other control signals such as alerting signals of incoming telephony 35 or audio/video conference calls. In the preferred embodiment, the user interface 120 is implemented as a user audio interface 255 illustrated in FIGS. 2 and 3, and as illustrated in detail in the related applications. The RF modulator 270, as disclosed and illustrated in the related applications, converts a baseband output video signal to a radio frequency output video signal, for transmission on the second communication channel 227 and visual display by the video displays 225. In the preferred embodiment, the second communication channel 227 is a coaxial cable, such as for cable television, distributed to one or more locations or terminations in the user or subscriber premises.

The processor arrangement 130 provides for the conversion of a received audio signal (from the network interface 110) into a visual or text representation of speech, which in turn is then converted into the form of the baseband output video signal (to be modulated and transmitted to the video displays 225 by the RF modulator 270). The processor arrangement 130 may also provide for speech generation from input text (to be transmitted to the network 104 through the network interface 110). As explained in the related applications and in greater detail below, the processor arrangement 130 may be comprised of a single integrated circuit ("IC"), or may include a plurality of integrated circuits or other components connected or grouped together, such as microprocessors, digital signal processors, ASICs, associated memory (such as RAM and ROM), and other ICs and components. As a consequence, as used herein, the term processor arrangement should be understood to equivalently mean and include a single processor, or arrangement of processors, microprocessors, controllers, or some other grouping of integrated circuits which perform the functions discussed in greater detail below. For example, in the preferred embodiment, the processor arrangement 130 is implemented as illustrated in FIGS. 2 and 3, as a microprocessor subsystem 260 (also illustrated in the related applications), together with a speech visualization subsystem (300 or 310), and may also include a speech generation subsystem (320).

Continuing to refer to FIG. 1, through the user interface 120, the speech visualization apparatus 101 is coupled to one or more physical interfaces 155, for a user to physically access the speech visualization apparatus for the input of one or more control signals, and also for the input of text for speech generation. The physical interfaces 155 typically include one or more of the telephones 150, keyboard 160, computer mouse 170, or computer 175. The telephones 150 may also be implemented as videophones. When telephones 150 are included, the physical input of the plurality of control signals is provided through a telephone keypad as DTMF (dual tone multifrequency) or pulse dialing signals, and with ordinary audio input and output provided through a microphone and speaker of the various telephones 150 (or videophones). In addition to or in lieu of the telephones 150, the keyboard 160, the mouse 170, and/or the computer 175, may also be utilized to input the plurality of control signals. The keyboard 160 or computer 175 are preferably utilized for the input of text for speech generation via the third communication channel 228 (although other methods of input, such as DTMF dialing, could also be used). The third communication channel 228 is illustrated as having a direct connection from the physical interfaces 155 to the processor arrangement 130, although other connections are also available; for example, the third communication channel 228 may be deleted in its entirety (FIG. 2), with input of control signals provided through a connection (e g. line 294 of FIG. 2) to the user interface 120 or user audio interface 255 (rather than to the processor arrangement 130).

Figure 2:
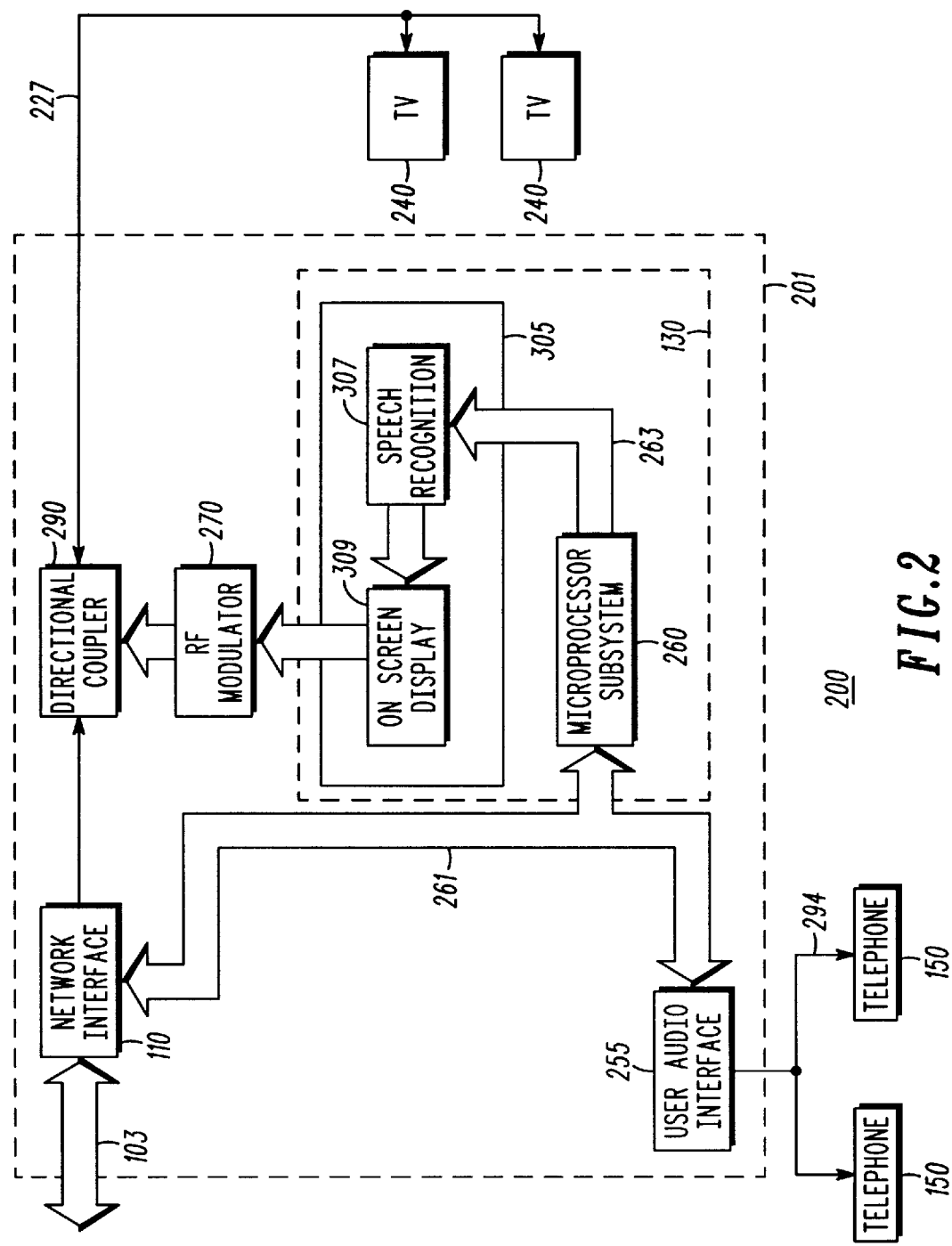
FIG. 2 is a block diagram illustrating a first preferred embodiment of a speech visualization apparatus and system in accordance with the present invention.
Figure 3:
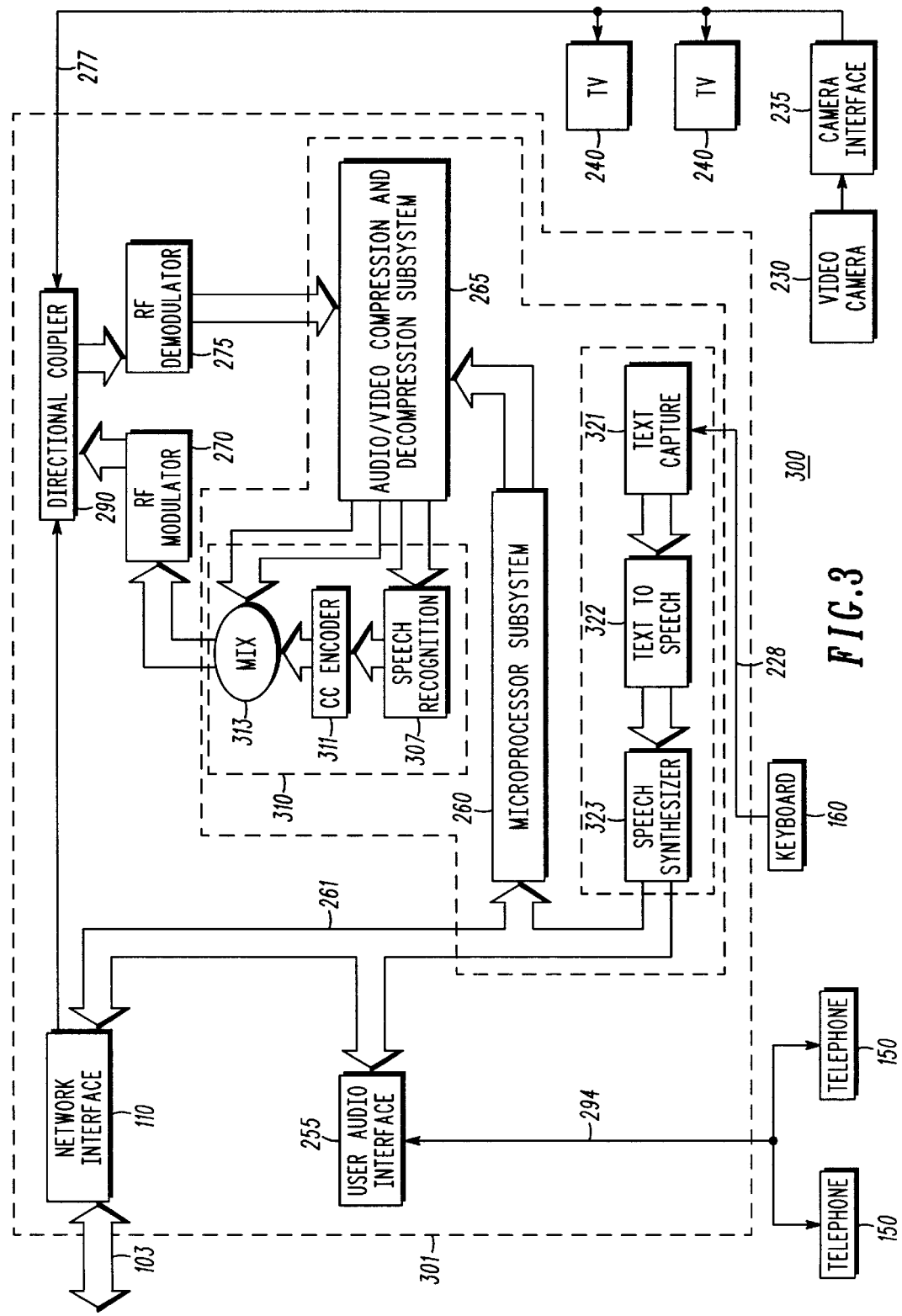
FIG. 3 is a block diagram illustrating a second preferred embodiment of a speech visualization and generation apparatus and system in accordance with the present invention.

Continuing to refer to FIG. 1, the RF modulator 270 converts a baseband output video signal from the processor arrangement 130, such as an NTSC/PAL composite video signal, to a radio frequency output video signal, such as an amplitude modulated vestigial sideband RF signal, which may be viewed via a video display 225 or, as illustrated in FIGS. 2 and 3, via a user's television 240, for example, when tuned to channel 3 or 4. The RF modulator 270 may be implemented in a variety of ways, including through use of a video modulator such as a Motorola MC1373, followed by a gain stage (amplifier), utilized in the preferred embodiment to overcome losses from a directional coupler 290 (illustrated in FIG. 2) which may feed the RF output video signal into the second communication channel 227, such as the coaxial cable system in the user premises.

As discussed in greater detail below, the methodology of the present invention may be programmed and stored, as a set of program instructions for subsequent execution, in the processor arrangement 130 and its associated memory and other equivalent components. The set of program instructions may also be stored in any storage device, such as a memory IC, a floppy disk, a CD ROM, or any other readable or executable media. In the preferred embodiment, the processor arrangement 130 is utilized, in conjunction with a stored set of program instructions and in response to any control signals entered by the user or received from the network 104, for a variety of functions. As a consequence, in the preferred embodiment the processor arrangement 130 has a plurality of operating modes such as, for example, operating modes for speech visualization, ordinary (POTS) telephony, synthesized voice (speech) transmissions, and also audio and video conferencing (in one of the preferred embodiments).

FIG. 2 is a block diagram illustrating a first preferred embodiment of a speech visualization apparatus 201 and a first preferred embodiment of a speech visualization system 200 in accordance with the present invention. The speech visualization system 200 includes a speech visualization apparatus 201, one or more telephones 150 (as physical interfaces 155), and one or more televisions 240 (as a type of video display 225) coupled to the speech visualization apparatus 201 through the second communication channel 227. Through the network interface 110 discussed above, the speech visualization apparatus 201 is also coupleable to a network 104 (not illustrated) via the first communication channel 103. The speech visualization apparatus 201 also includes an RF modulator 270 coupled to a directional coupler 290 which, as discussed above, feeds the RF output video signal from the RF modulator 270 into the second communication channel 227, such as a coaxial cable system in the user premises.

As disclosed in detail in the related applications, the user audio interface 255 is designed to interface with standard household telephone sets, including wireless devices and speaker phones, such as telephones 150. The user audio interface 255 is intended to support both audio POTS calls and video calls and, in conjunction with the network interface 110, also supports analog modem functions. In addition, in conjunction with one of the physical interfaces 155, such as a telephone 150 (or the keyboard 160, mouse 170 or computer 175 illustrated in FIG. 1), the user audio interface provides for entry of the various control signals utilized, for example, to select a speech visualization application or place telephony or video calls. In the preferred embodiment, any of the telephones 150 are utilized for entry of the various control signals, and ordinary POTS calls are processed in a "transparent" mode, such that placing and receiving telephone calls occur as if no speech visualization, video conferencing or other multimedia functions were present. Also in the preferred embodiment, speech visualization, video calls and multimedia functions are processed as exceptions, requiring a designated or predetermined dialing sequence entered by the user to invoke speech visualization, a video call or another media function. The various telephones 150 utilized in the preferred embodiment may be any type of ordinary telephone, including cordless (portable) telephones, corded telephones, DTMF or pulse dialing telephones, videophones, or speaker phones.

As disclosed in the related applications, the user audio interface 255 preferably includes a SLIC circuit (Subscriber Loop Interface Circuit) which provides "BORSHT" functions for telephone service within the user premises; ring generation circuitry; an audio codec for the audio portion of a video call or telephony call, providing analog-to-digital conversions for voice digitizing of an input (voice) audio signal originating from the microphone portion of one or more of the telephones 150, and digital-to-analog conversion for voice recovery from an output digital voice data stream or signal (to create an output audio signal to the speaker portion of the telephones 150); and a programmable digital signal processor (DSP) and associated memory (referred to as the voice processing DSP in the related applications, to distinguish another DSP referred to as a video processing DSP). The DSP of the user audio interface 255 contains program memory and data memory to perform signal processing functions such as DTMF/dial pulse detection and generation, analog modem functions, call progress tone (dial tone, busy tone) generation, PCM-to-linear and linear-to-PCM (pulse code modulation) conversion, and speech prompt playback. The memory associated with the DSP, in the preferred embodiment, includes high density read only memory (referred to as speech ROM) containing PCM encoded (or compressed) speech segments used for interaction with the user, such as in prompting the user for keypad DTMF or dial pulse entry when in the video calling or other multimedia modes. In addition, optional speech random access memory may be used for user voice storage functions, and electrically alterable, programmable non-volatile (flash) memory for storage of programs (and updates) or algorithms.

The processor arrangement 130 (of FIG. 1) is implemented in the speech visualization apparatus 201 as a microprocessor subsystem 260 and a speech visualization subsystem (or processor) 305 illustrated in FIG. 2. As illustrated in detail in the related applications, the microprocessor subsystem 260 consists of a microprocessor or other processing unit, such as the Motorola MC68LC302, and memory, which includes random access memory (RAM) and read-only memory (ROM), and in the preferred embodiment, also includes flash programmable memory (such as flash EPROM or $E^2$PROM), with communication provided over the bus 261 to the network interface 110, the user audio interface 255, and over the bus 263 to the speech visualization subsystem 305. The read only memory also utilizes flash programmable memory, such that the memory contents may be downloaded from the network 104. As a consequence, different versions of operating software (program instructions), such as upgrades, may be implemented without modifications to the speech visualization apparatus 201 and without user intervention. The microprocessor subsystem 260 provides control and configuration of the speech visualization processor 305, ordinary telephony call processing, digital telephony call processing, and is also used to implement an ISDN or other protocol stack when required for analog or digital video calls, such as ITU Q.931 message signaling.

The speech visualization subsystem 305, also referred to as a speech visualization processor, may also consist of a microprocessor or other processing unit, such as the Motorola MC68LC302, and memory, which includes RAM, ROM, and in the preferred embodiment, also includes flash programmable memory (such as flash EPROM or $E^2$PROM). As illustrated in FIG. 2, the speech visualization subsystem 305 includes two functional blocks, speech recognition subsystem (or processor) 307 and on screen display subsystem (or processor) 309. Depending upon the type of network interface 110 and associated or corresponding network 104, incoming speech from the network 104 may have various formats. For example, when connected to the PSTN, incoming speech will be received by the network interface 110 as an analog signal, and will preferably be converted to a digital format, such as pulse ode modulated (PCM) digital speech signal. When connected to a cable network, incoming speech will be received by the network interface 110 as a CACS or other protocol signal, which may be demodulated to provide a digitally encoded speech signal, such as a PCM encoded speech signal. When part of an audio/video conference call, the microprocessor subsystem 260 segregates the digital speech signal from the video portion, for separate processing (discussed below with reference to FIG. 3). The digital speech signal is transferred to the speech recognition subsystem 307. In the preferred embodiment, the speech recognition subsystem 307 is programmed with speech recognition software, which may be proprietary or which may be commercially available, such as the speech recognition software systems available from IBM or from Lexicus (affiliated with Motorola, Inc.). In the preferred embodiment, the speech recognition subsystem 307 is trainable over time, to increase speech recognition accuracy for frequent callers. From the digital speech signal, the speech recognition subsystem 307 generates a text representation of speech, which may have various formats, such as ASCII formatted text or other suitably encoded or formatted text. The text representation of speech is then transferred to the on screen display subsystem 309, which also is programmed with commercially available or proprietary on screen display software. The on screen display subsystem 309 may also be embodied utilizing a separate IC, such as a Philips OSD PCA855D. The screen display subsystem 309 converts the text representation of speech to an on screen display format, which is output as a baseband output video signal to the RF modulator 270. Other video formats may also be utilized, such as the closed caption format discussed below with reference to FIG. 3. The RF modulator converts the baseband output video signal to a radio frequency output video signal which is transmitted, for example, on channel 3 or 4, via the second communication channel 227 for display on the various televisions 240. As a consequence, the speech visualization apparatus 201 converts a received audio signal, such as an incoming speech signal from a network, to a radio frequency output video signal, transmitted to one or more video displays (such as televisions 240) for the visual display of speech.

As indicated above and in the related applications, in the preferred embodiment, the user initiates a multimedia application mode, such as a visual display of speech mode or a video conferencing mode, as an exception to the normal or ordinary telephony mode, by entering a specific predetermined sequence which is recognized by the DSP of the user audio interface 255 as a multimedia application mode sequence. Alternatively, a plurality of multimedia mode sequences may be utilized, with each predetermined sequence specific to a selected multimedia application mode, such as a video mode or a speech visualization mode. This methodology is also discussed below with reference to the flow chart of FIG. 4. For example, for a multimedia mode of the preferred embodiment, the first two digits of the specific, predetermined sequence are unique and specifically unused in a standard POTS call, such as "* *", and as a consequence, may specifically signal the DSP to enter a multimedia application mode rather than an ordinary telephony mode. Alternatively, other specific, predetermined sequences could be programmed by the user for recognition as a multimedia mode by the DSP. The various media application modes may be entered locally through one of the physical interfaces 155 or remotely via a connection through the network 104 and the network interface 110. Immediately after decoding the two special digits or other specific predetermined sequence indicating a multimedia mode, the speech visualization apparatus 201 initializes the speech visualization (or multimedia) control process, such as through the DSP generating, playing or displaying a speech or video prompt sequence, such as "Please select a call option or press the '#' key for help", which is stored in the ROM portion of memory of the user audio interface 255. The action taken by the DSP will then be responsive to and depend upon the sequence entered or key pressed by the user following the initial prompt. For example, if the '#' key is pressed, the user may see or hear a menu of commands such as, for example, the following:

"To enter video display of speech mode, press 1"
"To enter video conference mode, press 2"
"To enter home or premise automation mode, press 3"
"To enter voice mail, press 4"
"To hear this menu again, press #'

Following the user's selection of the particular or specific media application mode, such as a video display of speech mode, a sub-menu of commands is generated or displayed by the speech visualization apparatus 201 and system 200. For example, if the user selected a video display of speech mode, the user may see or hear a sub-menu of commands such as the following:

"To place a Directory call, press *'"
"To update the call Directory, press 2"
"To place a manual video call, press 3"
"To utilize speech generation, press 4"
"To train for speech recognition, press 5"
"To hear this menu again, press #'

One of the benefits of the user directory, in the preferred embodiment, is that with the advance selection of the party to be called, the speech recognition subsystem 307 may be informed that a call is to be placed to a previously "learned" party, i.e., a party with which the speech recognition subsystem 307 has had some training. As a consequence, the speech recognition subsystem 307 essentially may be more fine tuned to recognize a particular person's speech, improving the accuracy of the visual display of the audible speech. In addition, also through the entry of these various control signals, for calls which are received by the user, the user also may provide an indication to the speech recognition subsystem 307 that a particular party called, again to provide for such tuning of the speech recognition subsystem 307 to a previously learned pattern of the calling party.

Thus, in the preferred embodiment, an automated and user friendly prompting sequence is used to guide the user through the speech visualization operation or sequence, through a single (or integrated) physical interface, such as a telephone 150, rather than through multiple and different (and often confusing) interfaces. Other sophisticated systems for user interaction may also include use of the television 240 or other video display for on-screen visual display of a menu of options, with corresponding entry of user control signals, such as call control and placement information, occurring in a variety of ways, such as through the keypad of the telephones 150, through a infrared remote control link with the speech visualization apparatus 201, or through an input video path via the second communication channel 227 (illustrated in FIG. 3).

FIG. 3 is a block diagram illustrating a second preferred embodiment of a speech visualization and speech generation apparatus 301 and speech visualization (and speech generation) system 300 in accordance with the present invention. The speech visualization (and speech generation)

system 300 includes a speech visualization and speech generation apparatus 301, one or more telephones 150 and a keyboard 160 (as physical interfaces 155), one or more televisions 240 (as a type of video display 225) coupled to the speech visualization and speech generation apparatus 301 through the second communication channel 227, a video camera 230 and a camera interface 235. The video camera 230 and a camera interface 235 are described in detail in the related applications, and are utilized herein to illustrate full video conferencing capability, such that a video signal originating from the video camera 230 and the camera interface 235 in the user premises may be demodulated (by demodulator 275) and processed (in the audio/video compression and decompression subsystem 265) for transmission by the speech visualization and speech generation apparatus 301 via the first communication channel 103 to a network 104 (not illustrated).

Continuing to refer to FIG. 3, the speech visualization and speech generation apparatus 301 includes many of the same components discussed above with reference to FIG. 2, such as a network interface 110, a user audio interface 255, a microprocessor subsystem 260, an RF modulator 270, and directional coupler 290. The speech visualization and speech generation apparatus 301 includes a second type of speech visualization subsystem (processor), namely, speech visualization subsystem (or processor) 310, which is utilized for providing a closed caption format for the visual display of speech, and also includes a speech generation subsystem (processor) 320, to convert input text to an audible speech signal for transmission to a network 104. The speech visualization and speech generation apparatus 301 is also coupled to one or more telephones 150 for entry of control signals, and to a keyboard 160 for entry of text (for subsequent speech generation). The speech visualization and speech generation apparatus 301 is also controlled as discussed above with reference to the speech visualization apparatus 201, namely, through the entry of control signals (preferably via a telephone 150).

As disclosed in detail in the related applications, the audio/video compression and decompression subsystem 265 performs audio and video compression and decompression, preferably utilizing the ITU H.32x series of protocols, and is primarily utilized for video conferencing. For the visual display of speech from the audio portion of a video conference call (transmitted from a network 04), the audio signal is decompressed and separated from the video portion of the video conference call by the audio/video compression and decompression subsystem 265. The video portion of the video conference call is also decompressed and converted to a baseband output video signal (as described in detail in the related applications). The audio signal is then processed by the speech recognition subsystem 307 to form a text representation of speech, as discussed above with reference to FIG. 2. The text representation of speech is then processed by the closed caption encoder 311, converting the text representation to a closed caption video format, to form a closed caption video signal which may, for example, be implemented in the vertical blanking interval. The closed caption encoder 311 may be implemented utilizing a commercially available or a proprietary closed caption encoder or processor. The baseband closed caption video signal is then mixed, in mixer 313, with the baseband output video signal (from the video portion of the video conference call). The mixed video signal, containing both video information and closed caption information, is then modulated and transmitted by the RF modulator 270, for display on any one of the televisions 240. In this system 301 embodiment, a television 240 preferably includes a closed caption decoder, for decoding and displaying the closed caption signal.

Other information may also be included with the speech visualization information transmitted for display to the various televisions or other video displays. For example, loudness (volume) information may also be included and represented, also for example, utilizing a sine wave representation, with an amplitude correlated to or representing volume, or utilizing a bold type or underlining format, again correlated to volume or other speech emphases.

The speech visualization and speech generation apparatus 301 also includes a speech generation subsystem (processor) 320, coupled to a keyboard 160 for the entry of text, for subsequent conversion to speech and transmission to a network 104. In the preferred embodiment, the speech generation subsystem 320, also referred to as a speech generation processor, is programmed with speech generation software, which may be proprietary or which may be commercially available, or may be implemented utilizing commercially available ICs or other circuits. As discussed above with regard to the incoming speech signal, the audio (speech) signal to be transmitted to the network 104 may have various forms depending upon the type of network connection, such as, for example, an analog audio signal for transmission to a PSTN, a digital speech signal for transmission to an ISDN, or a CACS speech signal for transmission to a primary station and subsequent network communication. For speech generation, text is preferably input via the keyboard 160 and captured, as ASCII code or in another encoded or binary form, in text capture subsystem 321, and converted from text to speech format (such as words and phrases) in the text-to-speech subsystem 322. The speech format signal is then converted to synthesized speech in speech synthesizer 323, which may then be transmitted in any appropriate analog, digital, or encoded format to a network 104.

FIG. 4 is a flow diagram illustrating a speech visualization and speech generation method in accordance with the present invention. FIG. 4 also illustrates the multiple roles or modes of a telephone, such as telephones 150, in the system of the present invention, including providing ordinary telephony (POTS) and providing multimedia control, including control signals for selection of speech visualization and video conferencing modes. Referring to FIG. 4, beginning with start step 400, a request for service is detected, step 405, such as going off hook or receiving an incoming alert signal. Next, in step 410, a user indication or alert is provided, such as a visual or auditory dial tone, an incoming ring signal, or an incoming visual alert, and signaling information is collected, such as DTMF digits of a phone number or "". When a speech visualization mode has been requested in step 415, such as through entry of "" or receipt of an incoming message from the network 104, then the method proceeds to step 435. When a speech visualization mode has not been requested in step 415, the method proceeds to request or set up an ordinary telephony call, such as generating DTMF tones and connecting an audio path between the user's telephone and the network 104, step 420, followed by entering the transparent telephony 15 mode and transmitting audio (typically PCM) data to the network 104, step 425. The audio data will have been PCM encoded by the user audio interface 255, and will have been transformed into an appropriate digital or analog format (e.g., ISDN, POTS, etc.) by the network interface 110 for transmission to the network 104. When the telephony call is terminated, step 430, the method may end, return step 500.

Continuing to refer to FIG. 4, when the speech visualization mode has been requested in step 415, the method proceeds to step 435, and determines whether speech generation is also requested. When speech generation has also been requested in step 435, the method also proceeds to step 475, for speech generation concurrently with speech visualization. When speech visualization mode has been requested in step 415, independently of the speech generation request of step 435, the method proceeds to step 440 and initializes the speech visualization system, such as by playing an initial speech or video prompt as discussed above. Next, an audio signal is received, step 445, and the received audio signal is converted to a text representation of speech, step 450. The text representation of speech is then converted to a baseband output video signal, step 455, and modulated to form radio frequency output video signal, step 460. The radio frequency output video signal is then transmitted to a video display, step 465. When the speech visualization process is terminated, step 470, the speech visualization method may end, return step 500.

Concurrently with the speech visualization process of steps 440 through 470 discussed above, when speech generation has also been requested in step 435, the method also proceeds to step 475, to initialize the speech generation subsystem, also through the visual or auditory prompts mentioned above. Next, in step 480, input text is received, and in step 485, the received input text is converted to a speech signal, which may be either an analog or a digital encoded speech signal. In step 490, the speech signal is then transmitted, for example, to a telecommunications network, and when the speech generation process is terminated, step 495, the method may end, return step 500.

Numerous advantages of the various apparatuses, method and systems of the present invention are readily apparent. First, the various apparatuses, method and systems of the present invention provide for the visual display of speech, without requiring dedicated apparatuses and systems at both the local and remote sites of the communication. Any telephone at the far-end or remote location may be utilized, with the transmitted speech broadcast and displayed on any connected television or other video display throughout the premises of the local location. In addition, the various embodiments of the present invention also do not require significant manual intervention for operation. For example, in contrast with prior art apparatuses, no typing of the speech to be visualized is required. In addition, as the speech visualization apparatus is needed only at the local site of the communication, duplicative systems are eliminated, and the present invention may be implemented comparatively less expensively. In addition, the apparatuses and systems of the present invention are user friendly, providing systematic guiding for use and control of the speech visualization process.

Another significant feature of the apparatus, method and systems of the present invention is that it is an open system, such that any user of the speech visualization apparatus may communicate with anyone else having access to a telephone, providing a communication model of one communicating with all, given the ubiquity of the modem telephone. This advantage is in sharp contrast with the prior art closed systems, which required dedicated systems at all points of the communication, having a communication model of one communicating with only those few having access to the specialized dedicated equipment and system. In accordance with the present invention, any hearing impaired individual may communicate with anyone else via an ordinary telecommunications network, with no special equipment needed at any of these remote locations. This open system feature of the present invention is truly revolutionary and unique, enabling for the first time universal communication with the hearing impaired through any ordinary telecommunications network located anywhere in the world.

What is claimed is:

1. An apparatus for the visualization of speech, the apparatus comprising:

a network interface, the network interface coupleable to a first communication channel for reception of a first audio signal to form a received audio signal;

a radio frequency modulator to convert a baseband output video signal to a radio frequency output video signal and to transmit the radio frequency output video signal on a second communication channel for video display; and a processor arrangement, the processor arrangement coupled to the network interface and to the radio frequency modulator, the processor arrangement responsive, through a set of program instructions, to convert the received audio signal to a text representation of speech, and to further convert the text representation of speech to the baseband output video signal.

2. The apparatus of claim 1, further comprising a user interface coupled to the network interface and to the processor arrangement, the user interface for reception of a control signal of a plurality of control signals.

3. The apparatus of claim 2, wherein the user interface is further coupleable to a physical interface for entry of the plurality of control signals.

4. The apparatus of claim 3, wherein the physical interface is a telephone.

5. The apparatus of claim 3, wherein the physical interface is a keyboard.

6. The apparatus of claim 3, wherein the physical interface is a computer.

7. The apparatus of claim 1, wherein the processor arrangement has a plurality of operating modes, the plurality of operating modes including a telephony operating mode and a speech visualization operating mode, the processor arrangement further responsive to select the speech visualization operating mode in response to a control signal.

8. The apparatus of claim 1, wherein the processor arrangement further comprises:

a microprocessor subsystem;

a memory coupled to the microprocessor subsystem; and a speech visualization processor coupled to the microprocessor subsystem and to the memory.

9. The apparatus of claim 8, wherein the speech visualization processor further comprises:

a speech recognition processor; and an on screen display processor coupled to the speech recognition processor.

10. The apparatus of claim 8, wherein the speech visualization processor further comprises:

a speech recognition processor; and a closed caption encoder coupled to the speech recognition processor.

11. The apparatus of claim 1, wherein the processor arrangement is further responsive to receive input text to form received text and to convert the received text into a second audio signal; and wherein the network interface is further coupleable the first communication channel for the transmission of the second audio signal to form a transmitted audio signal.

12. The apparatus of claim 11, wherein the processor arrangement is further coupleable to a physical interface for entry of the input text.

13. The apparatus of claim 12 wherein the physical interface is a keyboard.

14. The apparatus of claim 12 wherein the physical interface is a computer.

15. The apparatus of claim 1, wherein the processor arrangement further comprises:
   a microprocessor subsystem;
   a memory coupled to the microprocessor subsystem;
   a speech visualization processor coupled to the microprocessor subsystem and to the memory; and
   a speech generation processor coupled to the microprocessor subsystem and to the memory.

16. The apparatus of claim 15, wherein the speech generation processor further comprises:
   a text capture processor;
   a text-to-speech processor coupled to the text capture processor; and
   a speech synthesizer coupled to the text-to-speech processor.

17. The apparatus of claim 1, wherein the network interface is a cable network interface.

18. The apparatus of claim 1, wherein the network interface is an ISDN interface.

19. The apparatus of claim 1, wherein the network interface is a POTS telephony interface.

20. The apparatus of claim 1, wherein the first audio signal is a portion of a combined audio/video signal.

21. An apparatus for visualization of received speech and for generation of transmissible speech, the apparatus comprising:
   a network interface, the network interface coupleable to a first communication channel for reception of a first audio signal to form a received audio signal and for transmission of a second audio signal to form a transmitted audio signal;
   a radio frequency modulator to convert a baseband output video signal to a radio frequency output video signal and to transmit the radio frequency output video signal on a second communication channel for video display; and
   a processor arrangement, the processor arrangement coupled to the network interface and to the radio frequency modulator, the processor arrangement coupleable to a physical interface for entry of input text, the processor arrangement responsive, through a set of program instructions, to convert the received audio signal to a text representation of speech, and to further convert the text representation of speech to the baseband output video signal, the processor arrangement further responsive to capture the input text and convert the input text to a speech signal, and to further convert the speech signal to the second audio signal.

22. A method for the visualization of speech, the method comprising:
   (a) receiving a first audio signal to form a received audio signal;
   (b) converting the received audio signal to a text representation;
   (c) converting the text representation to a baseband output video signal;
   (d) modulating the baseband output signal to a radio frequency output video signal;
   (e) transmitting the radio frequency output video signal for visual display of the text representation of the received audio signal.

23. The method of claim 22, further comprising:
   (f) receiving input text to form received input text;
   (g) converting the received input text to a speech signal;
   (h) converting the speech signal to second audio signal; and
   (i) transmitting the second audio signal to form a transmitted audio signal.

24. The method of claim 22, wherein prior to step (a), the method further comprising:
   detecting a request for service;
   providing a user indication;
   collecting signaling information; and
   in response to a first control signal, selecting a speech visualization mode.

25. The method of claim 24, further comprising:
   in response to a second control signal, selecting a speech generation mode.

26. The method of claim 24, wherein an ordinary telephony mode is transparently selected in the absence of the first control signal.

* * * * *

UNITED STATES PATENT AND TRADEMARK OFFICE
CERTIFICATE OF CORRECTION

PATENT NO. : 5,774,857
DATED : June 30, 1998
INVENTOR(S) : Newlin

It is certified that error appears in the above-indentified patent and that said Letters Patent is hereby corrected as shown below:

On the title page, Item [54] and Column 1, line 2,
In the title -- "Tranmission" should be "Transmission"

Signed and Sealed this

Twenty-ninth Day of June, 1999

Attest:

Q. TODD DICKINSON

Attesting Officer

Acting Commissioner of Patents and Trademarks